United States Patent
Wayama

(10) Patent No.: US 7,235,963 B2
(45) Date of Patent: Jun. 26, 2007

(54) ELECTRONIC CONTROL TYPE THROTTLE VALVE APPARATUS, NON-CONTACT TYPE ROTATION ANGLE DETECTING APPARATUS USED IN ELECTRONIC CONTROL TYPE THROTTLE VALVE APPARATUS ETC. AND SIGNAL PROCESSING APPARATUS FOR HALL ELEMENT

(75) Inventor: Eisuke Wayama, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/986,150

(22) Filed: Nov. 12, 2004

(65) Prior Publication Data

US 2005/0062468 A1    Mar. 24, 2005

Related U.S. Application Data

(62) Division of application No. 10/449,479, filed on Jun. 2, 2003, now Pat. No. 6,973,916.

(30) Foreign Application Priority Data

Jun. 3, 2002    (JP) .............................. 2002-161059

(51) Int. Cl.
    *G01R 33/07*    (2006.01)
(52) U.S. Cl. ................................................. 324/117 H
(58) Field of Classification Search ............ 324/117 H, 324/207.2, 207.23, 207.24, 207.25
    See application file for complete search history.

(56) References Cited

U.S. PATENT DOCUMENTS 5,469,136 A * 11/1995 Matsubara et al. ......... 340/445
5,606,948 A * 3/1997 Gonnering .................. 123/352
5,936,317 A * 8/1999 Sasanouchi et al. ........ 320/134
6,204,662 B1 * 3/2001 Shinjo et al. ............... 324/252
6,457,353 B1 * 10/2002 Kanke et al. .............. 73/117.3
6,489,479 B1 * 12/2002 Karpf et al. ................ 546/169
6,499,461 B2 * 12/2002 Kubota et al. ............. 73/118.1
6,647,328 B2 * 11/2003 Walker ........................ 701/36
6,707,297 B2 * 3/2004 Nath et al. .................. 324/240
6,812,694 B2 * 11/2004 Uenoyama ............. 324/207.22
2003/0221670 A1 * 12/2003 Wayama .................... 73/118.1
2004/0021462 A1 * 2/2004 Saito .......................... 324/251

FOREIGN PATENT DOCUMENTS

| JP | 8-68606 | | 3/1996 |
| JP | 11184625 A | * | 7/1999 |
| JP | 2000-74613 | | 3/2000 |

* cited by examiner

*Primary Examiner*—Jermele Hollington
(74) *Attorney, Agent, or Firm*—Crowell & Moring LLP

(57) ABSTRACT

In an electronic control type throttle valve apparatus, a throttle valve position sensor includes a magnet provided at a throttle valve shaft and a hall element which output changes in accordance with the rotational deviation of the magnet. The hall element is housed within a sensor chip together with an amplifier circuit. In a control unit provided separately from the sensor chip, there are provided with an A/D conversion circuit for converting an analog output from the hall element through the amplifier circuit into a digital signal and a digital processing circuit for performing temperature compensation and zero-span adjustment of the hall element in a digital manner.

7 Claims, 15 Drawing Sheets

ELECTRONIC CONTROL TYPE THROTTLE VALVE APPARATUS, NON-CONTACT TYPE ROTATION ANGLE DETECTING APPARATUS USED IN ELECTRONIC CONTROL TYPE THROTTLE VALVE APPARATUS ETC. AND SIGNAL PROCESSING APPARATUS FOR HALL ELEMENT

This application is a divisional of U.S. Application Ser. No. 10/449,479 filed on Jun. 2, 2003, now U.S. Pat. No. 6,973,916.

BACKGROUND OF THE INVENTION

The present invention relates to a rotation angle detecting apparatus using a hall element, a signal processing apparatus for the hall element and a throttle valve apparatus for an automobile using the rotation angle detecting apparatus, and preferably relates to an electronic control type throttle valve apparatus provided with a throttle valve driven by a motor.

Conventionally, a non-contact type rotation angle detecting apparatus (that is, a rotation angle sensor) has been known in which magnets are attached to a rotation shaft and the rotation angle of the rotation shaft is detected in cooperation with the magnets and hall elements disposed at the periphery of the rotation shaft.

In such a kind of the rotation angle detecting apparatus, it is known to constitute the hall elements and a circuit (a zero span adjustment circuit) for performing zero-span adjustment of the outputs of the hall elements and/or a circuit (a temperature compensation circuit) for compensating temperature drift of the hall elements as a single semiconductor package (chip) thereby to enhance the function of the sensor. Such a configuration is generally known as a hall IC.

For example, JP-A-8-68606 discloses the technique in which as a sensing unit for detecting a rotation angle, an EPROM and a register constituting an amplifier circuit and an adjustment circuit etc. are integrated together with a magnetic sensitive element formed by hall elements thereby to constitute a single chip.

Further, JP-A-2000-74613 discloses the technique that in a throttle valve sensor, a hall element generates a hall voltage in response to magnetic flux density changed in accordance with the opening degree of the throttle valve and an IC receives the hall voltage thereby to perform various kinds of processing such as temperature characteristic compensation.

SUMMARY OF THE INVENTION

In the aforesaid throttle valve apparatus, in order to perform the zero span adjustment or the temperature compensation with high accuracy, it is required to convert the output of the hall element into a digital signal from an analog signal to process the signal in a digital manner To this end, in the conventional rotation angle detecting apparatus of the semiconductor package type (hall IC), the hall elements, the A/D (analog to digital) conversion circuit, the zero span adjustment circuit and the temperature compensation circuit are collectively housed within a single mold resin. Further, in the case of transmitting the output of the hall IC to a control unit disposed outside, an analog transmission system is employed since a microcomputer on a signal receiving side is configured to convert the along input into a digital signal. Thus, a D/A (digital to analog) conversion circuit for converting the digital signal into an analog signal is also housed within the mold resin for the hall IC.

When both the A/D conversion circuit and the D/A conversion circuit are provided within the hall IC, it takes 4 milli-seconds (ms) as a signal processing time in total until the signal having been inputted into the hall IC is outputted therefrom, that is, 2 ms for each of the A/D conversion and the D/A conversion.

Due to the aforesaid processing time, there arises the following problem in the control of an internal combustion engine for an automobile, for example. That is, when the hall IC configured in the aforesaid manner is employed as a sensor for detecting the opening degree (rotation angle) of a throttle valve for controlling an air flow rate, there arises a time lag until the output change of the hall element itself responding to the change of the opening degree appears at the output terminal of the sensor, that is, at the output terminal of the hall IC as the output change of the hall IC. Thus, since neither of the real-time detection of the opening degree or the real-time control of the opening degree can be performed, there arises signal delay in the response.

Such a problem is remarkable in the case where an analog signal is converted into a digital signal and then taken in like a microcomputer (for example, an engine control unit). When considering the A/D conversion processing for inputting data at the microcomputer, 2 ms is further delayed in the signal response.

Further considering from another point of view, in the case of converting an analog signal into a digital signal and taking-in the digital signal like a microcomputer, it is not reasonable to perform both the A/D and D/A conversions before the taking-in operation at the microcomputer since the A/D conversion is duplicated at the hall IC and the microcomputer.

Accordingly, an object of the present invention is to eliminate wasteful or duplicated conversion processing of a hall element so that the output of the hall element can be applied to a processing circuit at the succeeding stage as early as possible thereby not to cause control delay etc. of a device, for example.

Another object of the present invention is to provide suitable configuration for the rotation angle detecting apparatus, using such a hall element, of a throttle valve shaft for an automobile.

Still another object of the present invention is to provide a throttle valve apparatus attached with such a sensor.

In order to attain the aforesaid object, the present invention is basically configured in the following manner.
(1) A non-contact type rotation angle detection apparatus in which a hall element generates an electric signal relating to a rotation angle of a rotation shaft in accordance with mutual operation between a magnet attached to the rotation shaft and the hall element, the apparatus further including:
a circuit mold chip in which both the hall element and an amplifier for amplifying an output of the hall element are sealed in a mold resin;
an analog-to-digital conversion circuit for converting an analog output of the amplifier outputted from an output terminal of the circuit mold chip into a digital signal at an outside of the circuit mold chip;
an electric conductor for coupling between the circuit mold chip and the analog-to-digital conversion circuit; and
a compensation circuit for subjecting an output of the analog-to-digital conversion circuit to zero-span adjustment and temperature compensation in a digital manner.

The following configuration is proposed as a related invention for attaining the same object.

(2) A signal processing apparatus for a hall element includes:
a hall element;
a microcomputer for inputting an output of the hall element having been converted from an analog signal into a digital signal and outputting an electric signal relating to the output of the hall element; and
a signal transmission path from an output terminal of the hall element to an input interface of the microcomputer, wherein
the signal transmission path has only one analog-to-digital conversion circuit.

Preferably, the output of the analog-to-digital conversion circuit is transferred to the microcomputer through a communication line.

(3) An output signal processing apparatus for a hall element which includes two hall elements disposed at different positions along a rotation direction of a rotation shaft and each responsive to rotation of the rotation shaft, and which is arranged to output a signal relating to a rotation position of the rotation shaft based on output signals from the two hall elements, the output signal processing apparatus for a hall element including:
a casing for holding the two hall elements;
two amplifiers for amplifying outputs of the two hall elements, the two amplifiers being attached to the casing;
a connector, formed at the casing, for extracting outputs of the two amplifiers;
a circuit apparatus, coupled to the connector, for receiving the output signal of the hall element, wherein an analog-to-digital conversion circuit for converting the output signal of the hall element is provided at the circuit apparatus.

(4) An electronic control type throttle valve apparatus includes:
a microcomputer for subjecting a signal necessary for controlling a throttle valve to a digital calculation in accordance with an operation state of an engine;
a motor driven by an electric signal obtained through the digital calculation;
the throttle valve which opening degree is controlled in accordance with the motor; and
a throttle valve position sensor for detecting a rotation angle of the throttle valve in accordance with an output of a hall element, wherein
a time period required for input processing of the output of the hall element is shorter than a calculation period required for digital calculation of the electric signal for controlling the motor.

(5) In an electronic control type throttle valve apparatus which includes a magnet attached to a throttle valve shat and rotates therewith and a hall element responsive to magnetic field of the magnet, and which is arranged in a manner that the hall element generates an electric signal relating to a rotation angle of the throttle valve shaft, the electronic control type throttle valve apparatus including:
a connector having a signal extracting terminal for extracting an output signal of the hall element; and
a signal transmission path from an output terminal of the hall element to a terminal of the connector which is arranged in a manner that a time period required for the signal generated at the hall element to appear at the signal extracting terminal is shorter than a time required for analog-to-digital conversion.

Preferably, the signal transmission path includes an amplifier for amplifying the output of the hall element and an electric conductor for coupling between the amplifier and the terminal of the connector.

(6) An electronic control type throttle valve apparatus includes:
a microcomputer for subjecting a signal necessary for controlling a throttle valve to a digital calculation in accordance with an operation state of an engine;
a motor driven by an electric signal obtained through the digital calculation;
the throttle valve which opening degree is controlled in accordance with the motor;
a throttle valve position sensor for detecting a rotation angle of the throttle valve in accordance with an output of a hall element, the throttle valve position sensor including a magnet which deviates in response to rotation of the throttle valve shaft and two hall elements disposed at different positions in rotation direction of the throttle valve shaft and the throttle valve position sensor being arranged to output a signal relating to a rotation position of the throttle valve shaft;
two circuit mold chips each having corresponding one of the hall elements and an amplifier for amplifying an output of the corresponding one of the hall elements, and each sealed within mold resin;
a casing for holding the circuit mold chips;
a connector, formed at the casing, for taking out outputs of the two amplifiers; and
an electric conductor formed at the casing through molding so as to couple between output terminals of the circuit mold chips and the connector.

Preferably, a deceleration gear mechanism is provided between an output shaft of the motor and the throttle valve shaft, wherein the casing also serves as a gear cover for covering the deceleration gear mechanism.

(7) An electronic control type throttle valve apparatus, includes:
an electrically driven actuator for driving a throttle valve provided at an intake air path of an internal combustion engine in accordance with a control signal;
a throttle valve position sensor for detecting an opening degree of the throttle valve; and
a control unit provided separately from a sensor chip, wherein
the throttle valve position sensor includes a magnet provided at a throttle valve shaft and a hall element which output changes in accordance with rotational deviation of the magnet, the hall element is housed within the sensor chip together with an amplifier circuit, and the control unit is provided with an analog-to-digital conversion circuit and a circuit for performing temperature compensation and zero-span adjustment of the hall element.

DESCRIPTION OF THE EMBODIMENTS

An embodiment of the present invention will be explained with reference to the accompanying drawings.

Figure 1:
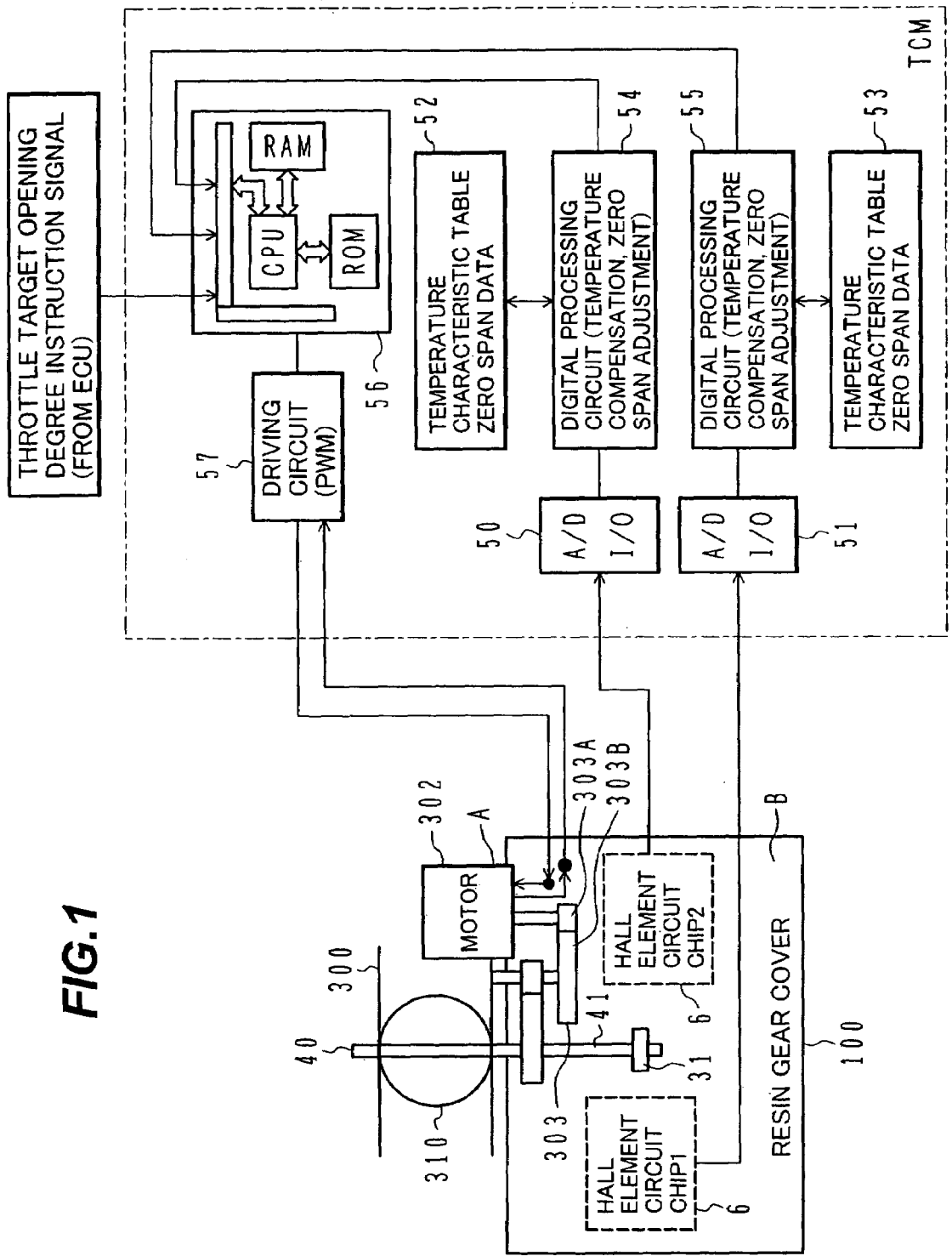
FIG. 1 is a circuit block diagram showing the configuration of an electron control type throttle valve apparatus according to the first embodiment of the present invention.

FIG. 1 is a circuit block diagram showing the configuration of an electron control type throttle valve apparatus according to the embodiment of the present invention.

The throttle valve apparatus according to the embodiment is provided with, when classified briefly, (1) a throttle valve mechanism A configured by a throttle valve 310 housed within a throttle body 300 and a deceleration mechanism 303 etc. for transmitting power of a motor 300 (electrically driven actuator) to a throttle valve shaft 40, (2) a sensor module B for detecting the rotation angle (opening degree) of the throttle valve 310, and (3) a throttle control module (hereinafter referred to a TCM) for calculating a throttle valve control signal based on an output signal from the sensor module B.

The throttle body 300 constitutes a part of an intake air path of an internal combustion engine and the throttle valve 310 is disposed at the intake air path.

The sensor module B acts as a throttle position sensor for detecting the opening degree of the throttle valve and is configured by a permanent magnet 31 provided at an end 41 of the throttle valve shaft 40 and chips 6 which output change in accordance with the rotation deviation of the permanent magnet 31. Each of the chips 6 is formed as a single chip so as to include a hall element (a magnetic sensitive element) and an amplifier circuit for amplifying the output of the hall element. The sensor chip may be called as a hall IC. Although each of the sensor chips acts sufficiently, two sensor chips are employed so as to perform the backup operation to each other when one of these sensor chips becomes failure or to perform the check operation at the time of failure diagnosis.

The principle of the sensing operation by the sensor chip 6 using the hall sensor will be explained with reference to FIGS. 6 to 10.

Figure 8:
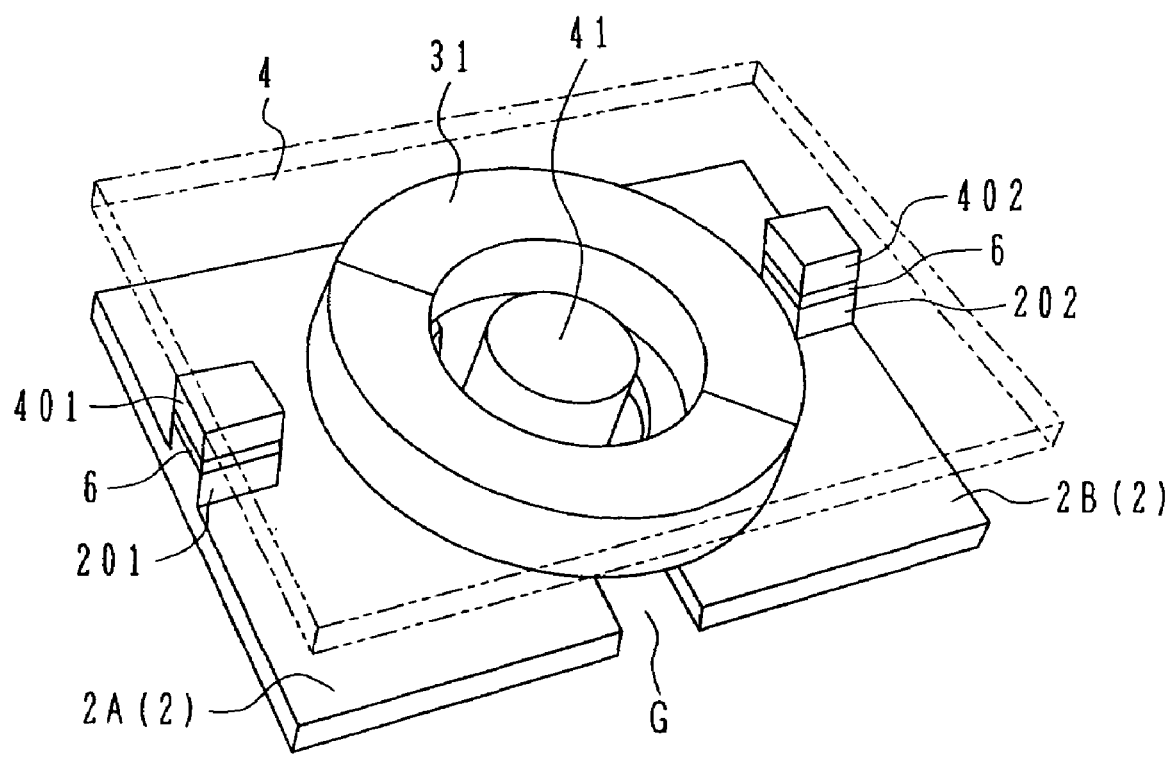
FIG. 8 is an oblique perspective view of FIG. 7.

FIG. 8 is a diagram seen through an upper stator 4 and showing the arrangement of the upper stator 4, a lower stator 2 (2A, 2B), a rotor (permanent magnet) 31 and the chips 6.

Figure 7:
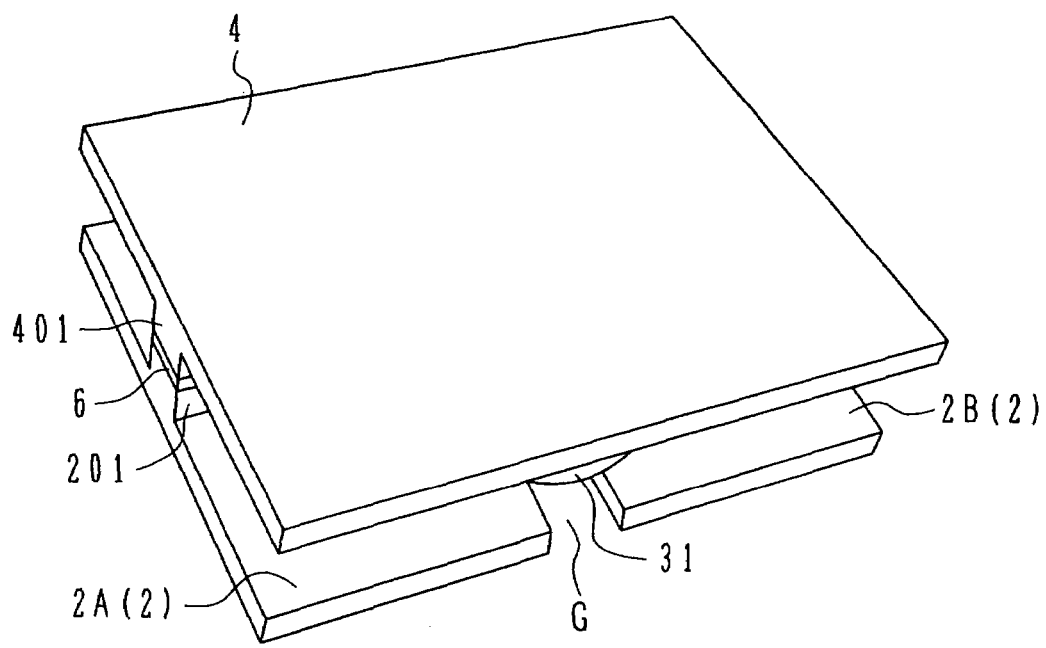
FIG. 7 is a perspective view showing the principle of a magnetic sensitive type rotation position sensor.

As shown in FIG. 8, the ring-shaped permanent magnet 31 is attached to the tip end of the rotation shaft (the throttle valve shaft) 41 serving as a detected member to constitute the rotor. As shown in FIGS. 7 and 8, the rotor 31 is disposed between magnetic plates (the upper stator and the lower stator) 4, 2 (2A, 2B) disposed in the vertical direction so as to oppose to each other. At least one of the upper and lower stators is arranged in a split manner in the horizontal direction. In this embodiment, the lower stator 2 is divided into two pieces 2A and 2B thereby to secure an air gap G therebetween.

The upper stator 4 and the lower stators 2A, 2B have magnetic projections 401, 402 and 201, 202 serving as magnetic flux converging portions, respectively. The magnetic projections 401 and 201 are disposed so as to oppose to each other with a uniform gap therebetween. The magnetic projections 402 and 202 are disposed so as to oppose to each other in the similar manner. The chips 6 having the hall elements (magnetic sensitive elements) are sandwiched between the magnetic projections 401, 201 and the magnetic projections 402, 202, respectively.

Although the magnetic projection at the upper stator and the magnetic projection at the lower stator are integrally formed in this embodiment, the magnetic projection at the upper stator may be formed separately from the magnetic projection at the lower stator in advance and these magnetic projections may be combined by the welding process etc. The magnetic projections are disposed at positions opposing to the outer periphery of the rotor 31 through the air gap.

The sensor chip 6 is configured by a circuit mold chip which is formed in a manner that the hall element and the amplifier circuit are integrated and sealed in a mold resin thereby to form in a chip shape.

Figure 9:
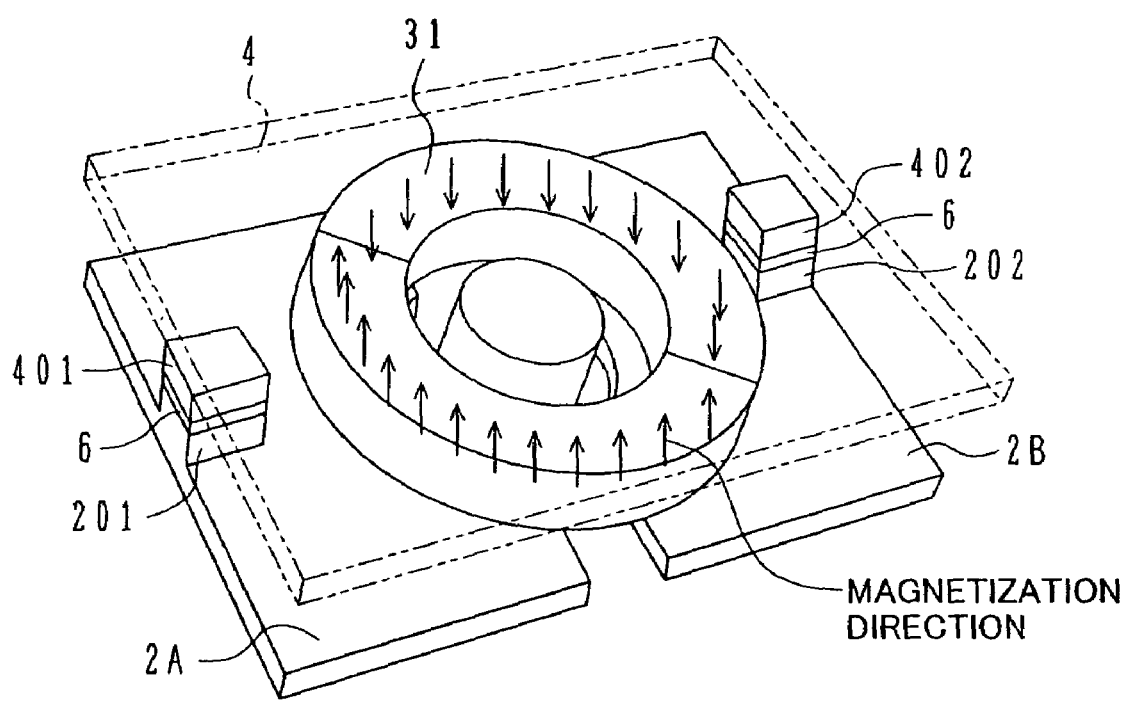
FIG. 9 is an oblique perspective view in which magnetizing direction is added in FIG. 8.

The rotor 31 is magnetized almost in vertical direction as shown by arrows in FIG. 9. That is, the rotor 31 is magnetized upward in the range of 180 degrees in the rotational direction and magnetized downward in the range of the remaining 180 degrees.

Figure 10:
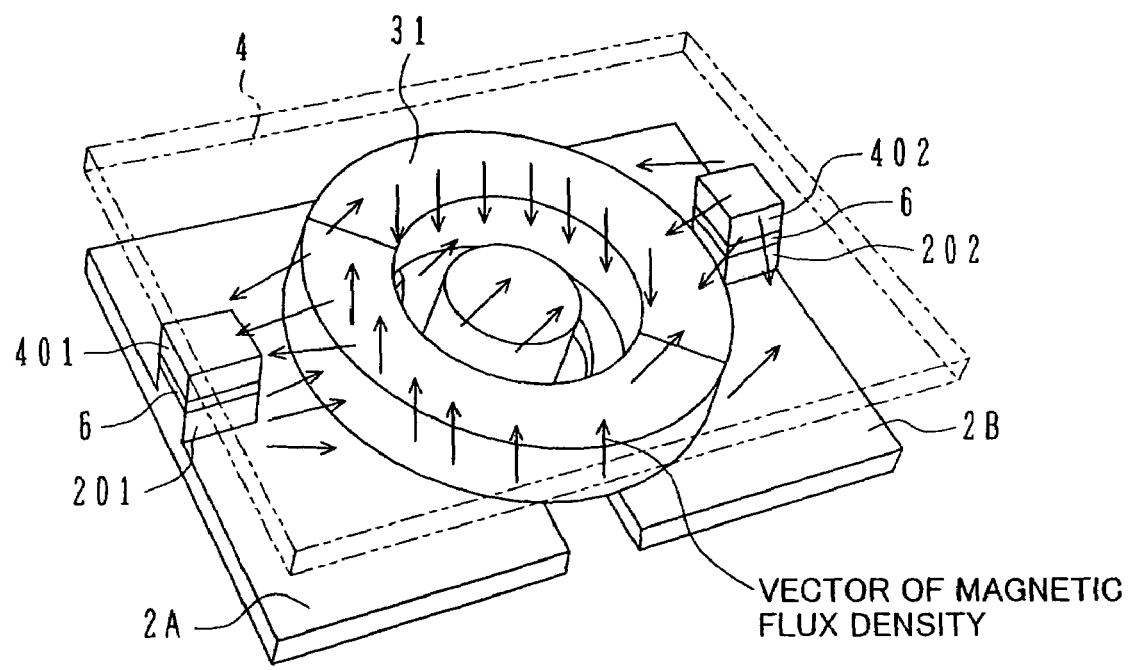
FIG. 10 is an oblique perspective view in which vectors of magnetic density are added in FIG. 8.

The magnetic density fluxes in this case are distributed as shown by arrows in FIG. 10. That is, the magnetic field generated by the rotor 31 forms a magnetic path passing through the upper and lower stators 401, 402. The magnetic fluxes converged by the magnetic projections 401, 201 and the magnetic projections 402, 202 pass through the corresponding chips 6, respectively. An amount of the magnetic fluxes passing through the sensor chip changes in accordance with the rotational position of the rotor 31. A signal according to the change of the amount of the magnetic fluxes is outputted from the sensor chip 6, whereby it is possible to detect the rotational position (rotation angle).

The circuit configuration of the rotation angle detection apparatus will be explained with reference to FIG. 6.

Figure 6:
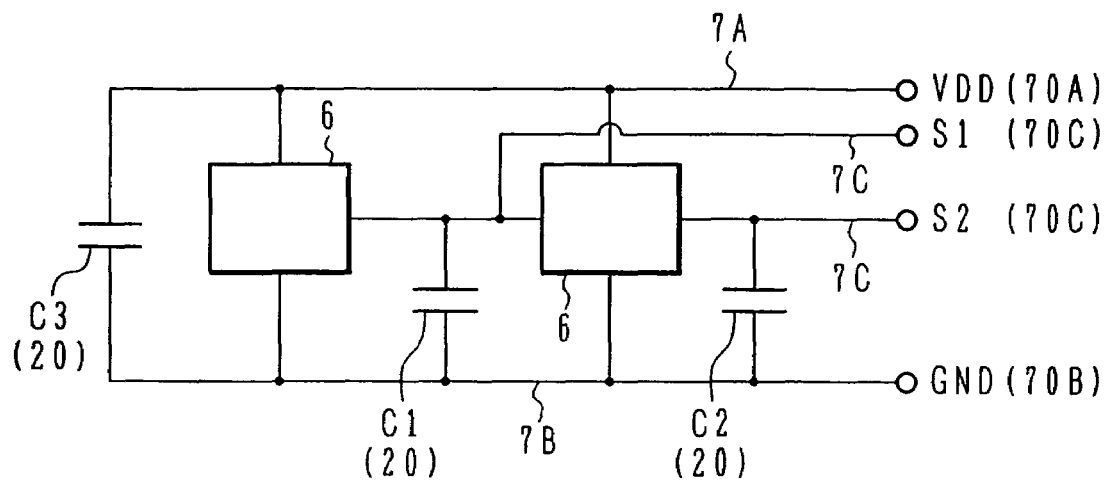
FIG. 6 is a circuit diagram showing the configuration of a sensor chip in the fourth embodiment.

FIG. 6 shows an example of the circuit configuration of the rotation angle detection apparatus in the case of using the two sensor chips (the circuit module chips) 6. Each of the chips 6 is coupled between a power source VDD and the ground GND. The output of one of the hall ICs 6 is 2 is taken from an output terminal S1 and the output of the other of the hall ICs 6 is 2 is taken from an output terminal S2.

In this embodiment, a capacitor C3 is coupled between the power source VDD and the ground GND, a capacitor C1 is coupled between the output terminal S1 and the ground GND and a capacitor C2 is coupled between the output terminal S2 and the ground GND.

The capacitor C3 is used for protecting from electric disturbance noise and surge. Each of the capacitors C1 and C2 operates as an element not only for protecting from electric disturbance noise and surge but also for filtering the internal noise of the hall IC. Each of the capacitors C1, C2 and C3 may be used by itself or may be used together with a zener diode and a resistor (each not shown), as the occasion demands.

The explanation will be made as to the TCM shown in FIG. 1.

The TCM includes input/output interfaces 50, 51 corresponding to the chips 6, respectively; storage devices 52, 53 for storing zero-span data (zero-point data) and a temperature characteristic table relating to the outputs from the chips 6, respectively; digital processing circuits (temperature compensation circuits and zero-span adjusting circuits) 54, 55 for subjecting the outputs of the chips 6 to zero-span (zero-point) adjustment and temperature compensation by digital processings, respectively; a microcomputer 56 for controlling the opening degree of the throttle valve; and a driving circuit 57 for driving a throttle valve driving motor.

The outputs from the chips 6 are converted into digital data by the input/output interfaces 50, 51 and sent to the circuits r54, 55, respectively. The zero-span data is obtained in a manner that the outputs of the chips 6 obtained when the throttle valve opening degree is set to zero (the minimum) are subjected to the digital processing and the values obtained by the digital processing are stored in the storage devices 52, 53 as zero-point outputs, respectively.

Each of the storage devices 52, 53 has a plurality of the temperature characteristics tables relating to the output of the hall element in correspondence with temperature ranges. Each of the digital processing circuits 54, 55 subjects the outputs (the throttle valve opening degree signal and the rotation angle signal) of the corresponding sensor chip 6 having been A/D converted to the zero-point adjustment and also to the temperature compensation (temperature correction) by using the temperature characteristic tables according to the ambient temperature of the sensor chip 6 and sends data thus subjected to the zero-point adjustment and the temperature compensation to the microcomputer 56.

The microcomputer 56 serves as a main portion for controlling the throttle valve opening degree and includes a ROM for storing control program, a RAM for storing the throttle valve opening degree signal etc. in a randomly rewritable state, and a central processing unit (CPU) which inputs a target throttle valve opening degree inputted from an engine control unit (ECU) disposed outside and an actual throttle valve opening degree signal thereby to calculate a control signal so that the throttle valve has the target opening degree. The driving circuit 57 is driven by the control signal from the CPU thereby to control the motor current. The driving circuit 57 is formed by a pulse width modulation circuit (PWM), for example.

Figure 2:
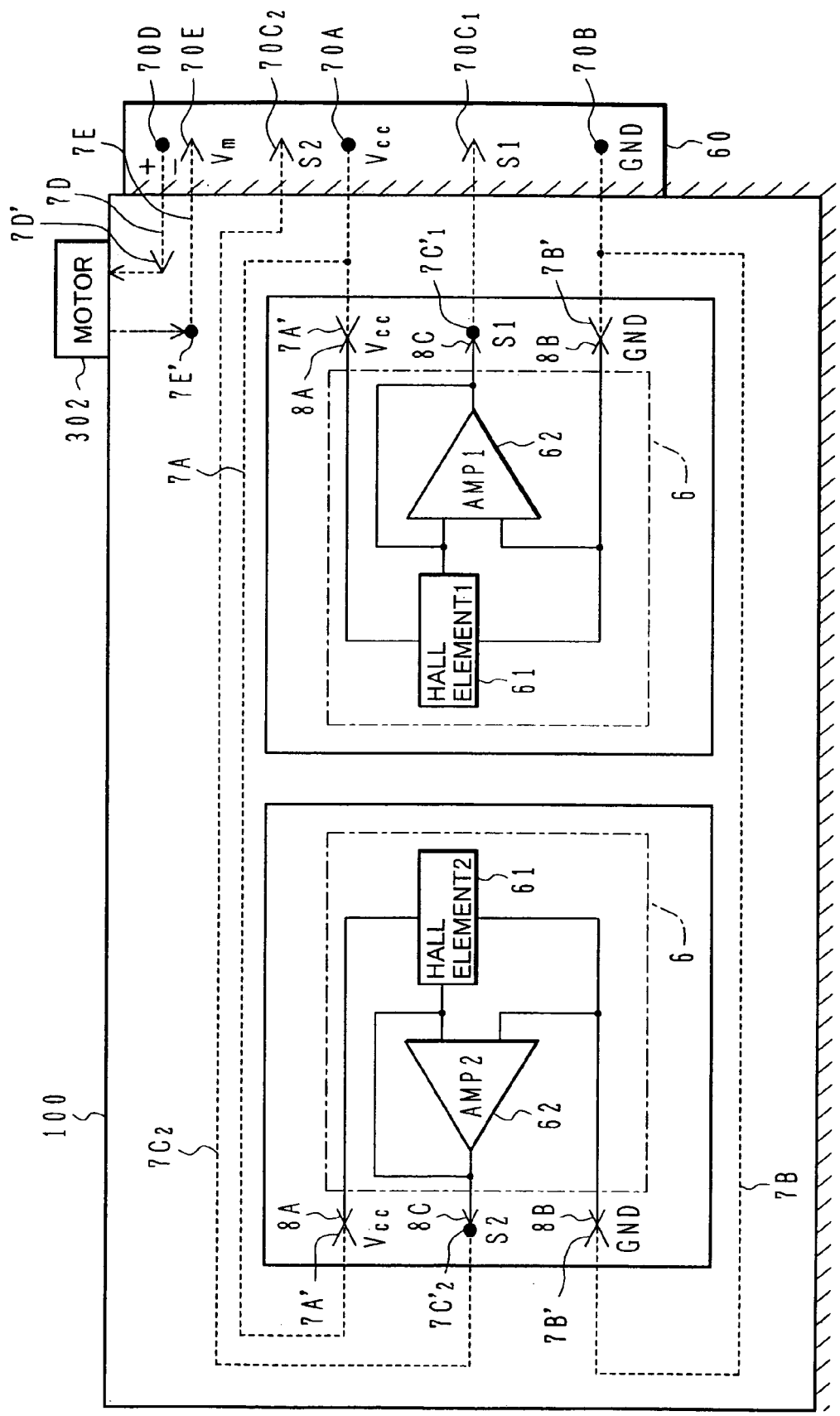
FIG. 2 is a schematic diagram showing a relation between a gear cover and sensor chips (circuit mold chips) in the first embodiment.
Figure 13:
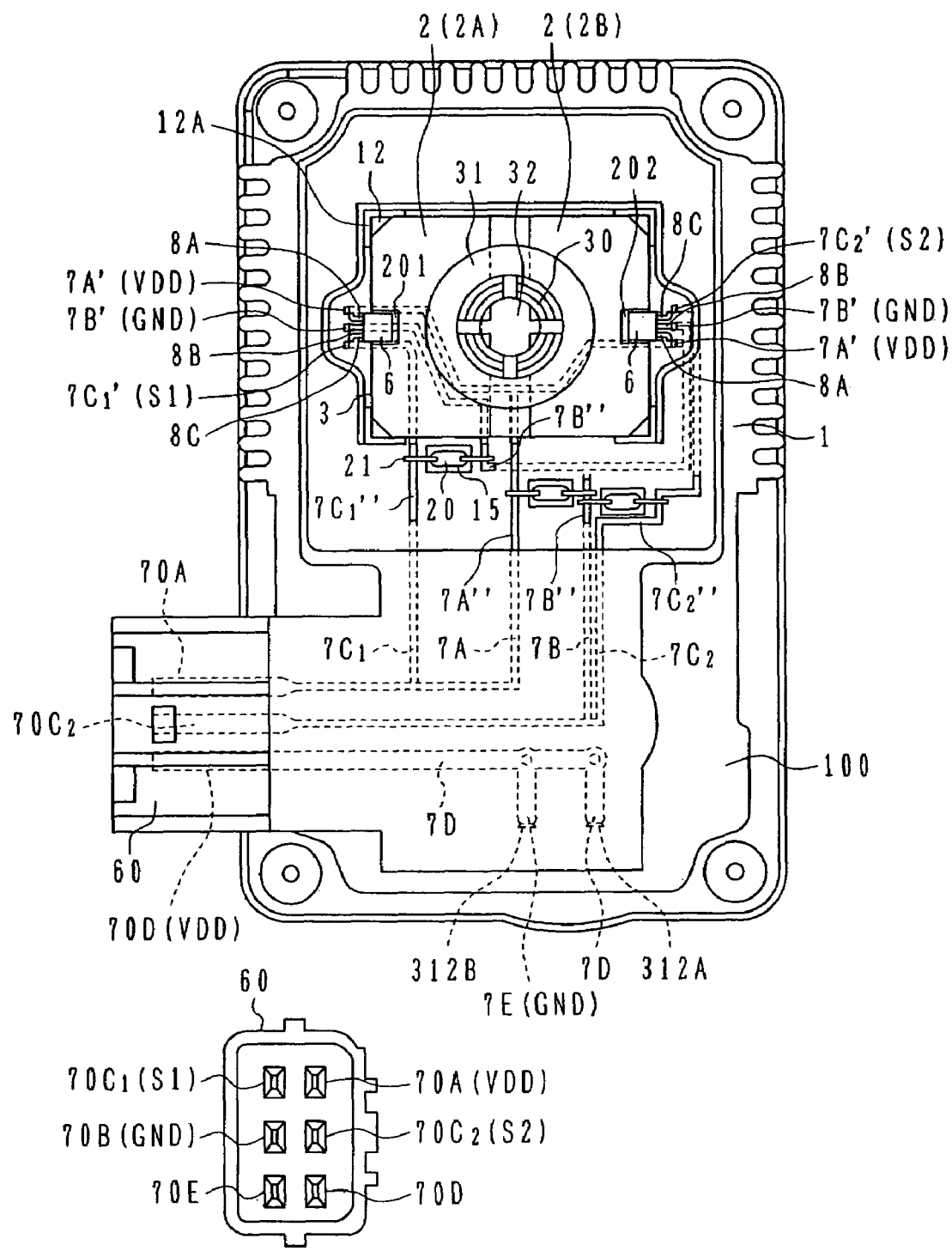
FIG. 13 is a top view in which a cover and an upper stator are removed from the rotation position sensor shown in FIG. 14 thereby to show the inner structure of a housing and also is a top view showing a connector portion.

The sensor chips (the circuit mold chips) 6 are incorporated together with the stators 4, 2 (2A, 2B) within a gear cover 100 made of resin to be attached to the throttle body 300 (the detailed example of the mounting structure thereof will be explained later with reference to FIG. 11). FIG. 2 is a schematic diagram showing a state where the stators are omitted and the two chips 6 are incorporated within the cover 100. In the figure, the chips 6 are illustrated exaggeratedly in their sizes, and in fact the ratio of the chips 6 occupying within the gear cover 100 is small as shown in FIG. 13, for example.

Each of the chips 6 is formed by sealing both a magnetic sensitive element (hall element) 61 and an amplifier circuit (AMP) 62 together within a mold resin (shown by an alternate long and short dash line) and is provided with, as terminals, a power source terminal (Vcc) 8A, a ground terminal (GND) 8B and output terminals (S1, S2) 8C.

A connector case 60 is integrally formed with the resin cover 100. A power source line 7A, a ground line 7B, output signal lines 7C1, 7C2 are buried within the resin cover 100 through the insert molding. The one ends 7A 7B of these lines and the output signal lines 7C1 7C2 are exposed at the inner surface of the cover 100 and coupled to the corresponding terminals 8A, 8B, 8C of the chips 6. The other ends 70A, 70B, 70C1, 70C2 thereof protrude within the connector case 60 as connector terminals.

The power source lines (+line) 7D and (−line) 7E of the motor 302 for driving the throttle valve are buried within the resin cover 100 through the insert molding. The one ends 7D 7E of these power source lines are exposed at the inner surface of the cover 100 and coupled to the power source terminals of the motor 302, and the other ends 70D, 70E thereof protrude within the connector case 60 as connector terminals.

According to the embodiment shown in FIGS. 1 and 2, the output signals of the hall element 61 are subjected to the A/D conversion at the outside of the circuit mold chip 6. As a signal processing apparatus for the hall element, only an A/D converter 50 (51) is provided at a signal transmission path from the output terminal of the hall element 61 to the input interface of the microcomputer 54. According to such a configuration, it is not necessary to perform the A/D conversion, the D/A conversion and the A/D conversion in the path from the sensor chip (hall IC) 6 to the microcomputer 54 like the conventional technique but it is required to perform only the A/D conversion in the path. Thus, it is possible to realize the rotation angle detecting apparatus (the throttle position sensor) which is high in the signal transmission speed and excellent in the responsibility. That is, a time period required for the input processing of the output signal of the hall element 61 can be made shorter than a calculation period required for the digital calculation of the electric signal for controlling the motor. Further, the signal transmission path from the output terminal of the hall element to the connecter terminal can be configured so that a time period required for the signal generated from the hall element 61 to appear at the signal extracting terminals 70C1, 70C2 is made shorter than a time period required for the A/D conversion.

Figure 11:
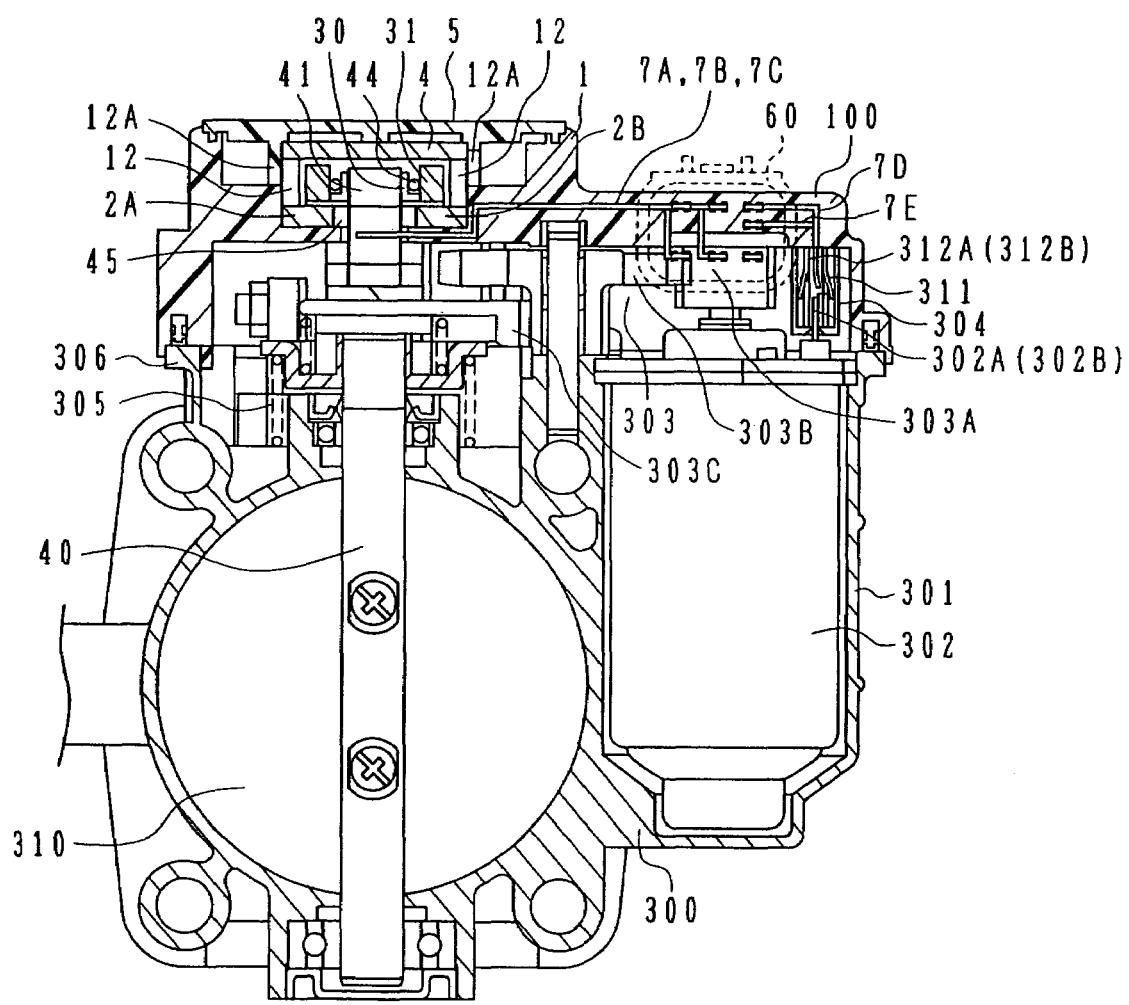
FIG. 11 is a longitudinal sectional diagram (a sectional diagram along a line A-A in FIG. 14) showing a state where the rotation position sensor (throttle position sensor) according to the first embodiment is mounted in a throttle body.
Figure 12:
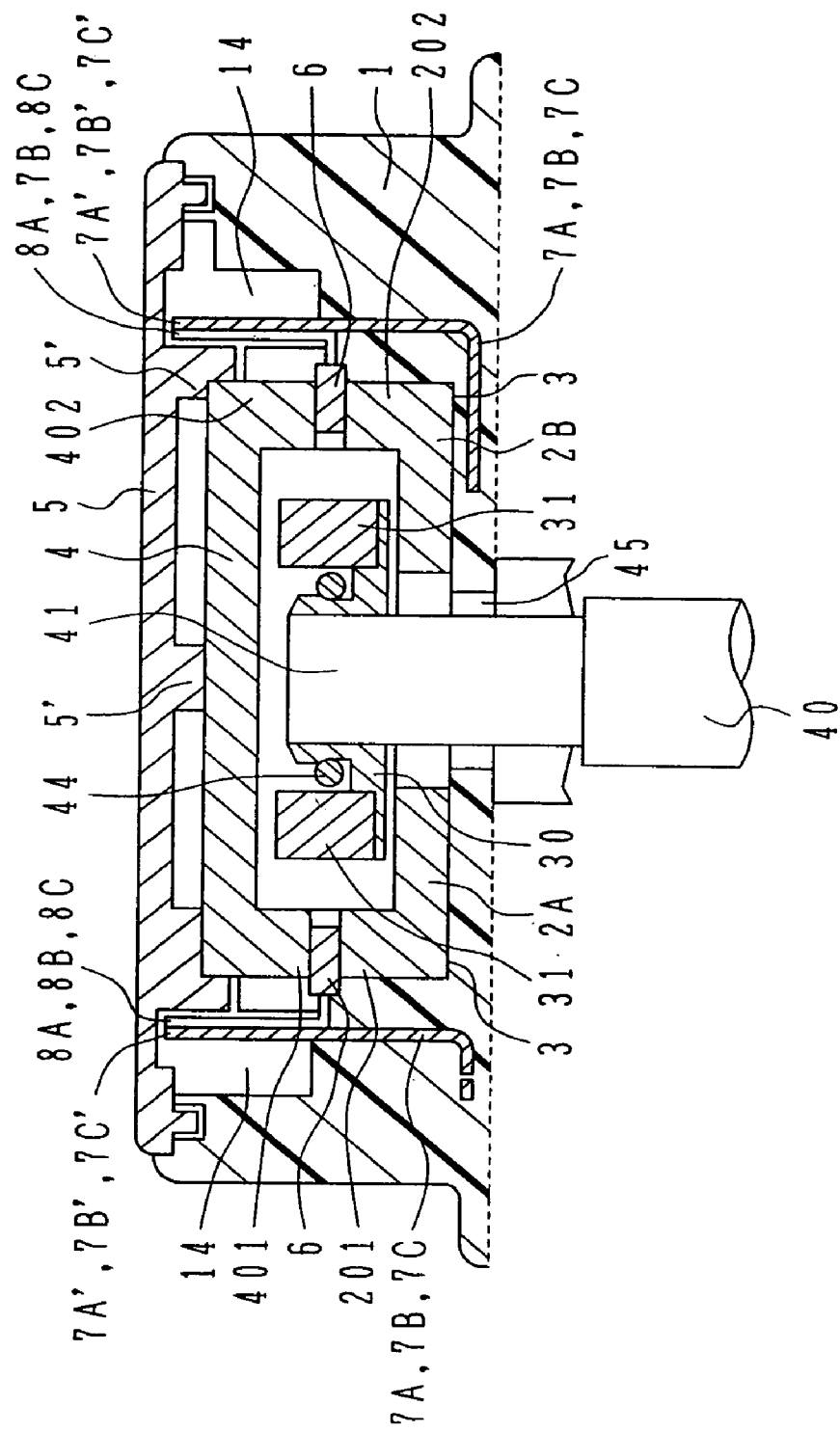
FIG. 12 is a sectional diagram showing only the rotation position sensor in the configuration of FIG. 11.
Figure 14:
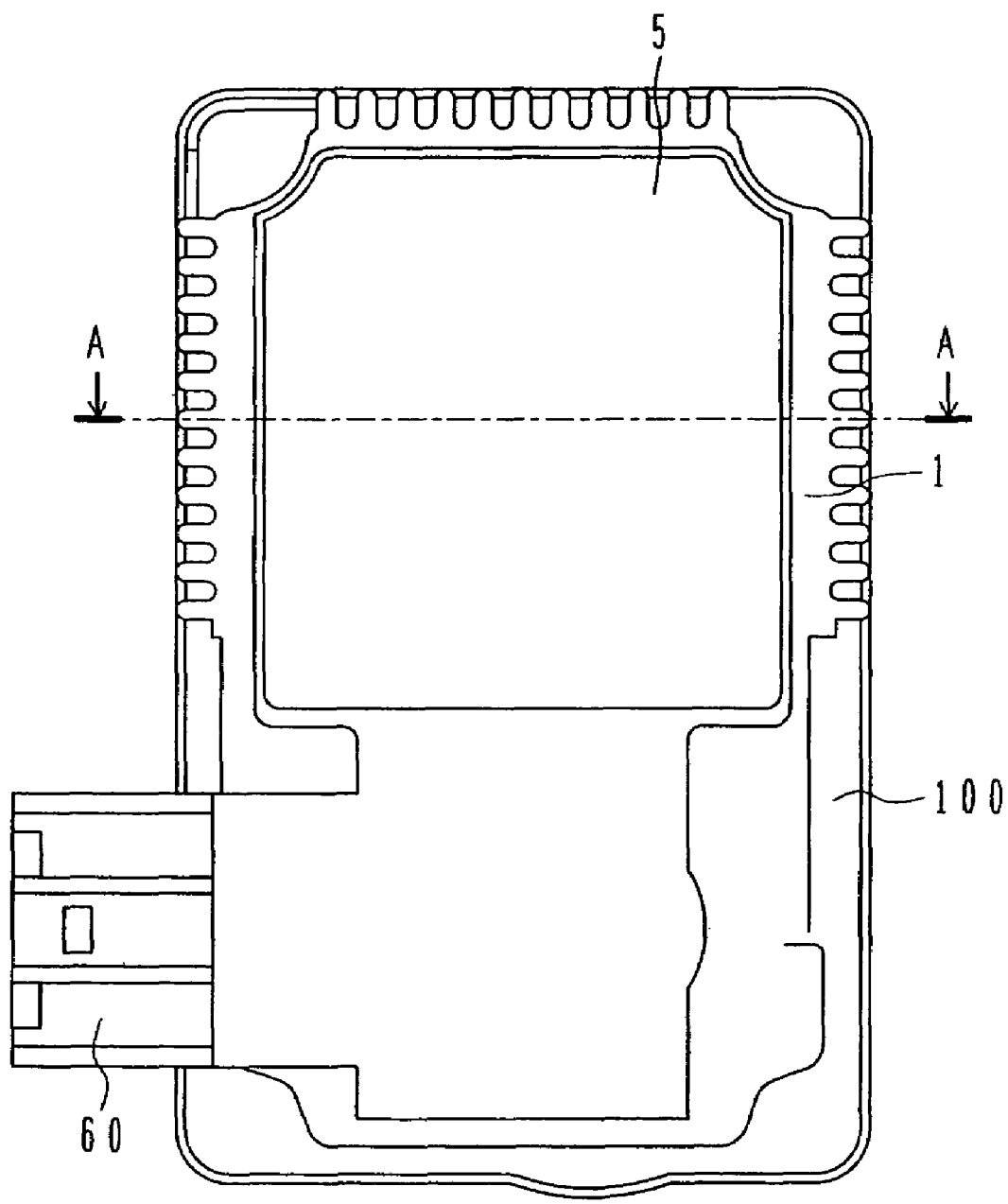
FIG. 14 is a plan view of the gear cover.
Figure 15:
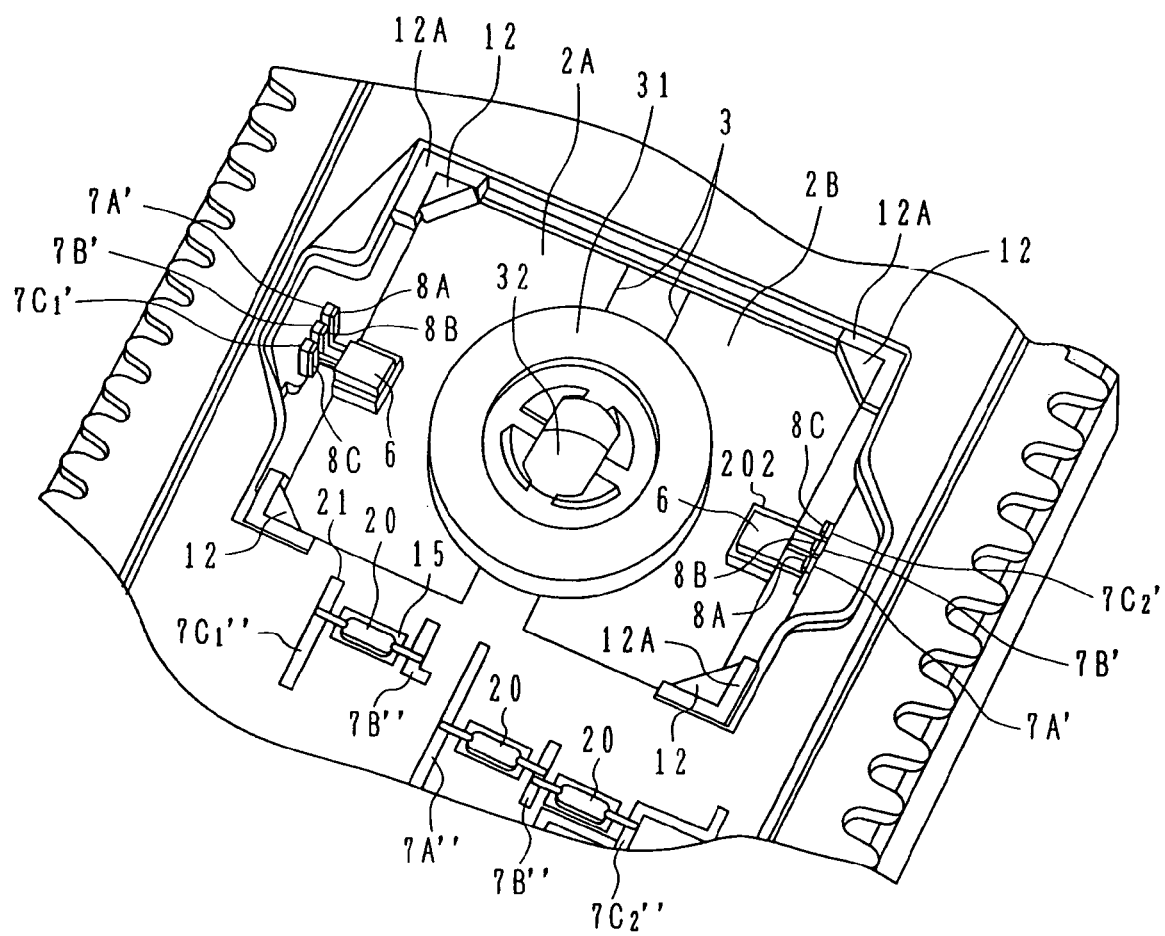
FIG. 15 is a partial enlarged perspective view of FIG. 13.
Figure 16:
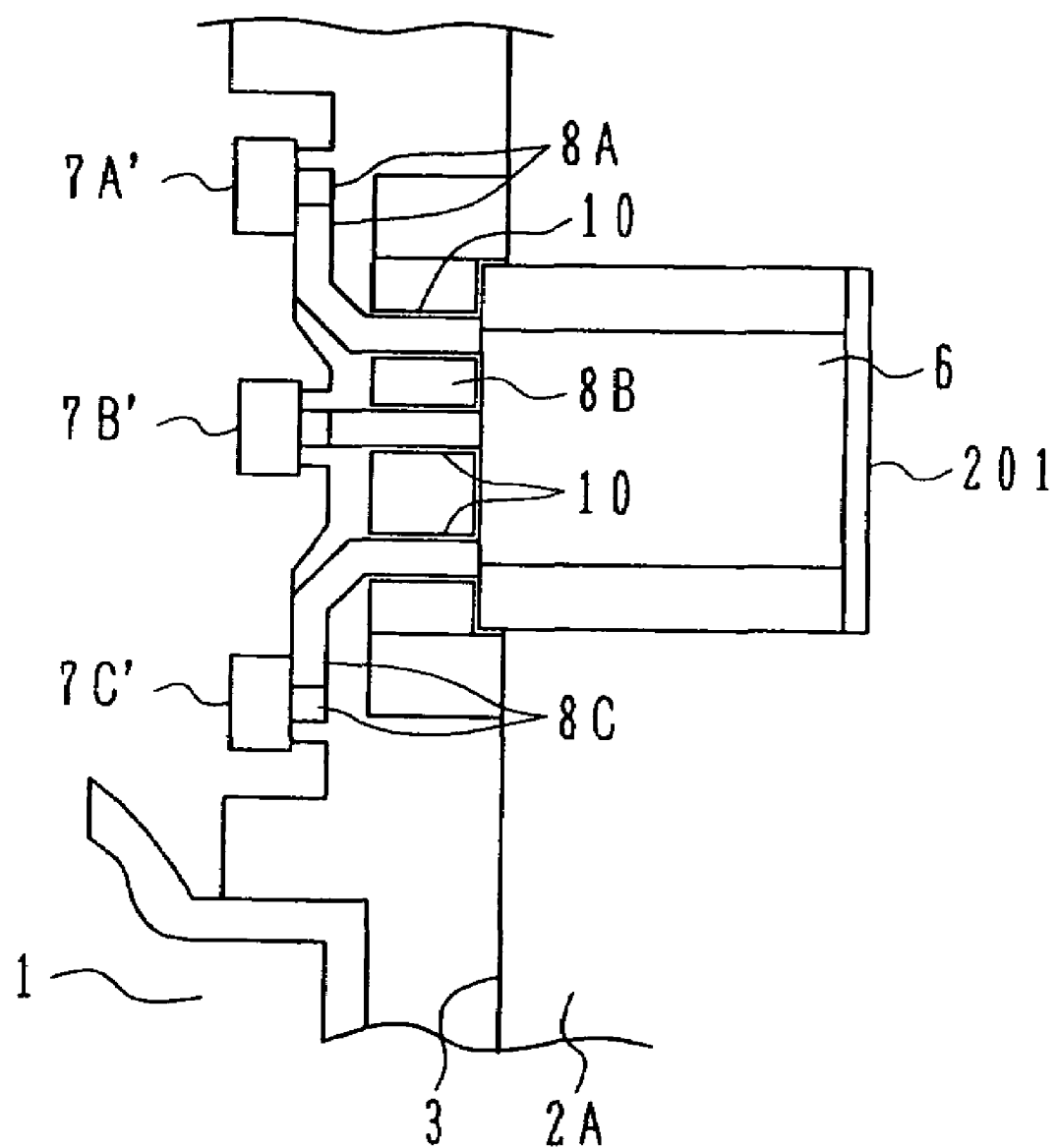
FIG. 16 is a partial enlarged view of FIG. 13.

FIG. 11 is a longitudinal sectional diagram (a sectional diagram along a line A-A in FIG. 14) of a non-contact type throttle valve apparatus according to the embodiment of the present invention. FIG. 12 is a sectional diagram showing only the rotation angle detection apparatus (the throttle position sensor) in the configuration of FIG. 11. FIG. 13 is a top view in which the sensor cover 5 and the upper stator 4 are removed from the gear cover 100 thereby to show the inner side of the housing and also is a top view showing the connector portion. FIG. 14 is a plan view of the gear cover 100 to be attached to the throttle body 300. FIG. 15 is a partial perspective view of FIG. 13, and FIG. 16 is a partially enlarged view of FIG. 13.

In this embodiment, the gear cover 100 for the gear mechanism 303 for transmitting the motor power is attached to the throttle body 300 having the throttle valve 310. The throttle position sensor (the throttle valve rotation angle detection apparatus) is attached to the gear cover 100.

As shown in FIGS. 13 and 14, the gear cover 100 is made of composite resin and is formed integrally with a connector 60 having external connection terminals 70A, 70B, 70C1, 70C2, 70D, 70E for electrically coupling with an external device and the power source.

The throttle body 300 is integrally formed with a motor housing 301 for housing the motor 302 for driving the throttle valve shaft 40 and a gear housing 306 for disposing the gear mechanism 303 and a default mechanism. The gear cover 100 covers the gear housing 306 and a sensor housing 1 is formed at the gear cover 100.

The power source terminal 302A and the ground terminal 302B of the motor 302 are coupled to intermediate terminals 312A, 312B provided at the gear cover 100 through a coupling metal member 311, respectively.

The power of the motor 302 is transmitted to the throttle valve shaft 40 through the gear mechanism 303 (a pinion 303A, an intermediate gear 303B, a final gear 303C) thereby to drive the throttle valve 310.

As shown in FIG. 12, the housing 1 is provided at the bottom wall thereof with a lateral hole 45 for introducing the one end 41 of the rotation shaft 40. At the inner bottom of the housing 1, two recess portions 3 for housing the lower stators 2A, 2B therein are formed separately in the left and right direction at the periphery of the lateral hole 45. The lower stators 2A, 2B are attached to the recess portions 3 by means of adhesive, respectively. Although the lower stators 2A, 2B are held by the housing 1 by means of the adhesive, the lower stators 2A, 2B may be held by the housing 1 through the insert molding in stead of the adhesive.

In the housing 1, a spacer 12 (see FIG. 15) having both function of relatively positioning the upper stator 4 with the lower stators 2A, 2B and maintaining the space between both the upper an lower stators is formed integrally with the housing 1.

The spacer 12 is formed so as to cover the four corners of the lower stators 2A, 2B and L-shaped convex portions 12A for receiving the corner portions of the upper stator 4 are formed at the upper surface of the spacer.

As shown in FIG. 14, the connector 60 is integrally formed with the cover 100 at the side surface of the gear cover 100. The external connection terminals formed at the connector 60 through the insert molding include the terminals 70A, 70B, 70C1, 70C2 used for the two hall ICs 6 of the rotational position sensor and the terminals 70D, 70E for the motor for driving the throttle valve, as shown in FIG. 13. In this embodiment, as to the power source terminal VDD (the external connection terminal 70A) and the GND terminal (the external connection terminal 70B) for the two chips 6, these terminals VDD and GND are shared by the two chips 6. In the plan view of FIG. 13, the external connection terminal 70B is hidden by the terminal 70C2 and so not shown, also the external connection terminal 70C1 is hidden by the terminal 70A and so not shown, and further the external connection terminal 70E is hidden by the terminal 70D and so not shown.

As shown in FIG. 13, the external connection terminals relating to the rotational position sensor have four terminals in total, that is, the one power source terminal 70A (VDD), the one ground terminal 70B (GND) and the two sensor input/output terminals 70C1, 70C2 (S1, S2). The external connection terminals have six terminals in total, that is, these four terminals relating to the sensor, the one power source terminal 70D for the motor and the ground terminal 70E therefore. These terminals are disposed in two lines each having the two terminals.

The terminal 7A corresponding to the power source terminal VDD (the external connection terminal 70A), the terminal 7B corresponding to the ground terminal (the external connection terminal 70B), the terminals 7C1, 7C2 corresponding to the sensor output terminals S1, S2 (the external connection terminals 70C1, 70C2), and the terminals 7D, 7E corresponding to the motor terminals 70D, 70E are buried in the gear cover 100 through the insert molding.

Of the conductors 7A, 7B, 7C1, 7C2, the power source conductor 7A is divided into two pieces on the way thereof and the one end 7A of each of the divided pieces is drawn to the combined portion with the power source terminal 8A of the corresponding hall IC 6. The ground conductor 7B is also divided into two pieces on the way thereof and the one end 7B of each of the divided pieces is drawn to the combined portion with the ground terminal 8A of the corresponding hall IC 6.

The conductors 7A, 7B, 7C1, 7C2 are exposed at the parts 7A 7B 7C1 7C2 thereof so as to be coupled to the circuit elements such as a capacitor 20, respectively. Of these parts, the one exposed portion 7A is provided in correspondence with the power source conductor 7A, the two exposed portions 7B are provided in correspondence with the ground conductors 7B, the one exposed portion 7C1 and the one exposed portion 7C2 are provided in correspondence with the sensor output conductors 7C1, 7C2, respectively (see FIGS. 13 and 14).

These exposed conductor portions are arranged in the order of the sensor output conductor exposed portion 7C1 the ground conductor exposed portion 7B the power source conductor exposed portion 7A the ground conductor exposed portion 7B and the sensor output conductor exposed portion 7C2.

The circuit element such as the capacitor 20 is coupled between the sensor output conductor exposed portion 7C1 nd the ground conductor exposed portion 7B between the power source conductor exposed portion 7A and the ground conductor exposed portion 7B and also between the ground conductor exposed portion 7B and the sensor output conductor exposed portion 7C2 This circuit element is inserted into a recess portion 15 provided between the conductor exposed portions at the inner surface of the gear cover 100.

As shown in FIG. 15, the one ends 7A 7B 7C1 7C2 of the conductors 7A, 7B, 7C1, 7C2 are exposed on the inner wall surface of the housing at predetermined positions of the input/output terminals 8A, 8B, 8C of the hall IC 6. The one ends 7A 7B 7C1 7C2 of the conductors are bent so as to protrude on the inner wall surface of the housing.

As shown in FIG. 16, at the inner wall in the periphery of the portions where the lower stators 2A, 2B of the housing 1 are provided, groove-shaped guides 10 are provided so as to conduct the input/output terminals 8A, 8B, 8C of the hall IC 6 to the terminal combining portions with the conductor one ends 7A 7B 7C1 7C2 The input/output terminals 8A, 8B, 8C are fit into the guides 10 and so guided thereby. The guides 10 also serve to position the sensor chip 6.

The input/output terminals 8A, 8B, 8C of the sensor chip 6 are combined with the conductor one ends 7A 7B 7C1 7C2 through the welding operation. The terminals 8A, 8B, 8C are bent so as to be combined at their end portions with the conductor one ends 7A 7B 7C1 7C2.

As shown in FIGS. 11 and 12, a magnet holder 30 is attached to the one end 41 of the rotation shaft 40. The magnet holder 30 holds the annular permanent magnet (rotor) 31. A reference numeral 32 depicts a shaft hole provided at the holder 30 (see FIG. 13). The rotation shaft 40 is applied with a return force by a return spring 305. A reference numeral 44 depicts a C ring.

As shown in FIG. 12, the upper stator 4 is adhered to a projection 5 provided at the inner side of the sensor cover 5 of the sensor housing 1 and so held by the sensor cover 5. The sensor cover 5 is adhered to the upper opening of the housing 1 in a manner that the four corner portions of the upper stator 4 are positioned and held at the upper surface of the spacer 12. The upper stator 4 is positioned with respect to the lower stators 2A, 2B by the spacer 12. The spacer 12 holds a uniform gap between the upper stator and the lower stator. The chips 6 are positioned between the magnetic projections 401 and 201 and also between the magnetic projections 402 and 202, respectively.

Since the wire harness within the housing 1 of the non-contact type rotational position sensor is almost formed through the insert molding, the space within the housing is prevented from being complicated by the wiring and so it makes possible to perform the assembling procedure of parts and the electric coupling procedure of the circuit elements.

The sensor chip 6, which is required to have sufficient positioning accuracy, can be positioned simply and further the positioning between the terminals 8A to 8C and the conductors 7A to 7C can also be positioned easily, by merely fitting the terminals 8A to 8C thereof into the guide grooves 10.

Both the relative positioning between the upper stator 4 and the lower stators 2A, 2B and the holding of the uniform gap therebetween can be performed simply with a high accuracy by the spacer 12 with an L-shaped projection 12A provided at the housing 1.

The connector 60 is formed at the one side of the gear cover 100 and the external connection terminals 70A to 70E are formed within the connector through the insert molding.

The sensor chip can be protected from the electric external noise and serge with the relatively simple configuration. Further, since the capacitor and the zener diode etc. as the circuit elements for protecting from the electric external noise and serge are not required to be housed within a highly integrated IC, the sensor chip can be prevented from being larger in size. The circuit elements such as the capacitor 20 can be coupled between the conductor exposed portions 7A 7B 7C in a state of being inserted into the recess portions 15, so that the space for the circuit elements within the housing 1 can be saved and so the mounting density of the circuit elements can be enhanced.

Thus, the non-contact type rotational position sensor, which can be summed up the parts, miniaturized, simplified in its assembling procedure and made highly accurate, can be realized.

Further, since the upper and lower stators 4, 2A, 2B are held by the sensor cover 5 and the housing 1 before the assembling procedure thereof, when the cover is attached to the housing, the upper and lower stators can be relatively positioned automatically to each other. Further, since the magnetic projections and the hall ICs are also configured to be disposed in the vertical direction together with the stators, the sensor can be further summed up the parts, miniaturized, simplified in its assembling procedure and made highly accurate.

Figure 3:
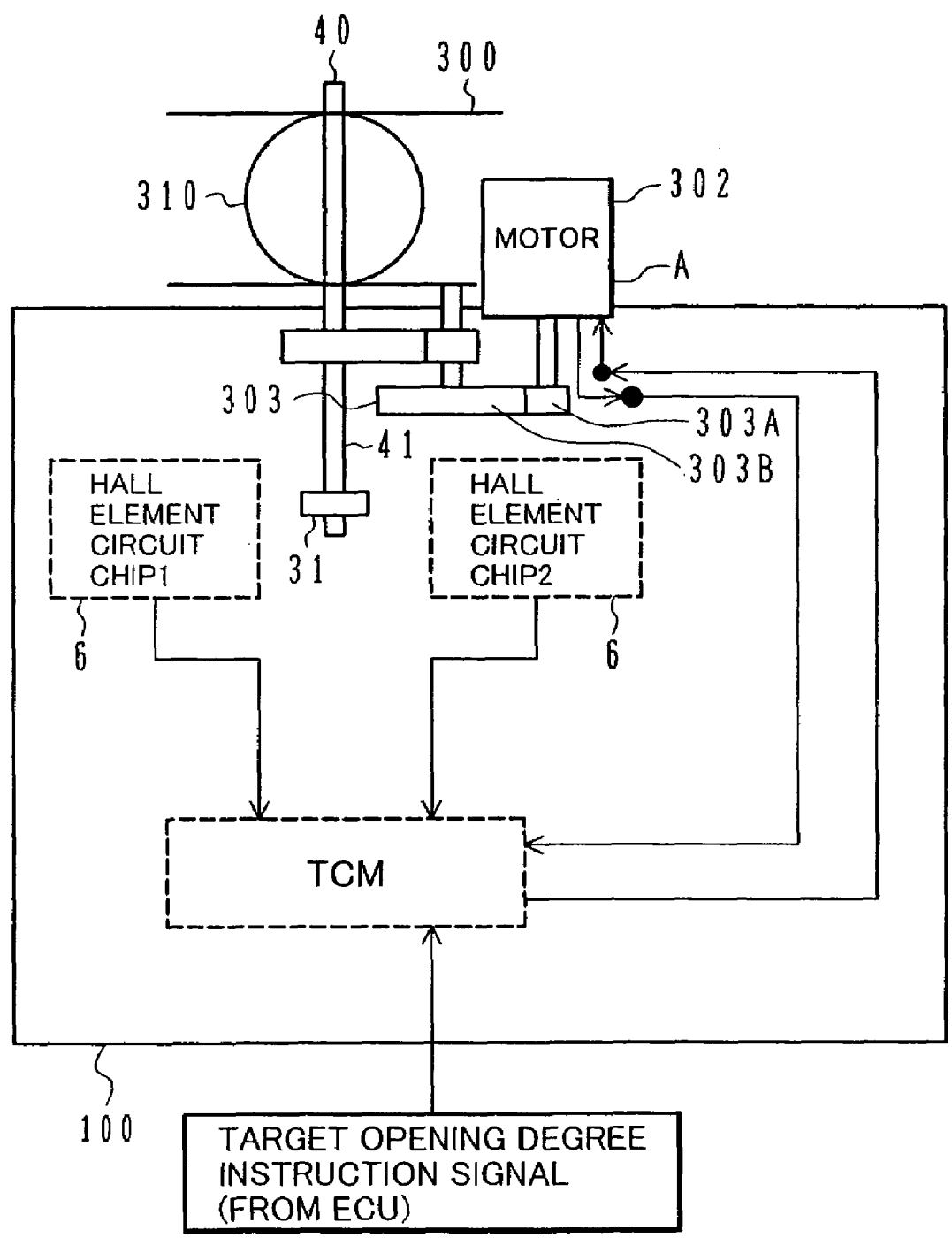
FIG. 3 is a circuit block diagram showing the configuration of an electron control type throttle valve apparatus according to the second embodiment of the present invention.

FIG. 3 is a schematic diagram showing the throttle valve apparatus according to the second embodiment of the invention.

The second embodiment differs from the first embodiment in a point that the TCM as well as the circuit mold chips (sensor chips) 6 for the throttle position sensor are incorporated within the gear cover 100. The circuit configuration of each of the circuit mold chip 6 and the TCM is same as FIG. 1. The conductors for coupling the circuit mold chip 6 with the TCM may be wired at the gear cover 100 through the insert molding.

Figure 4:
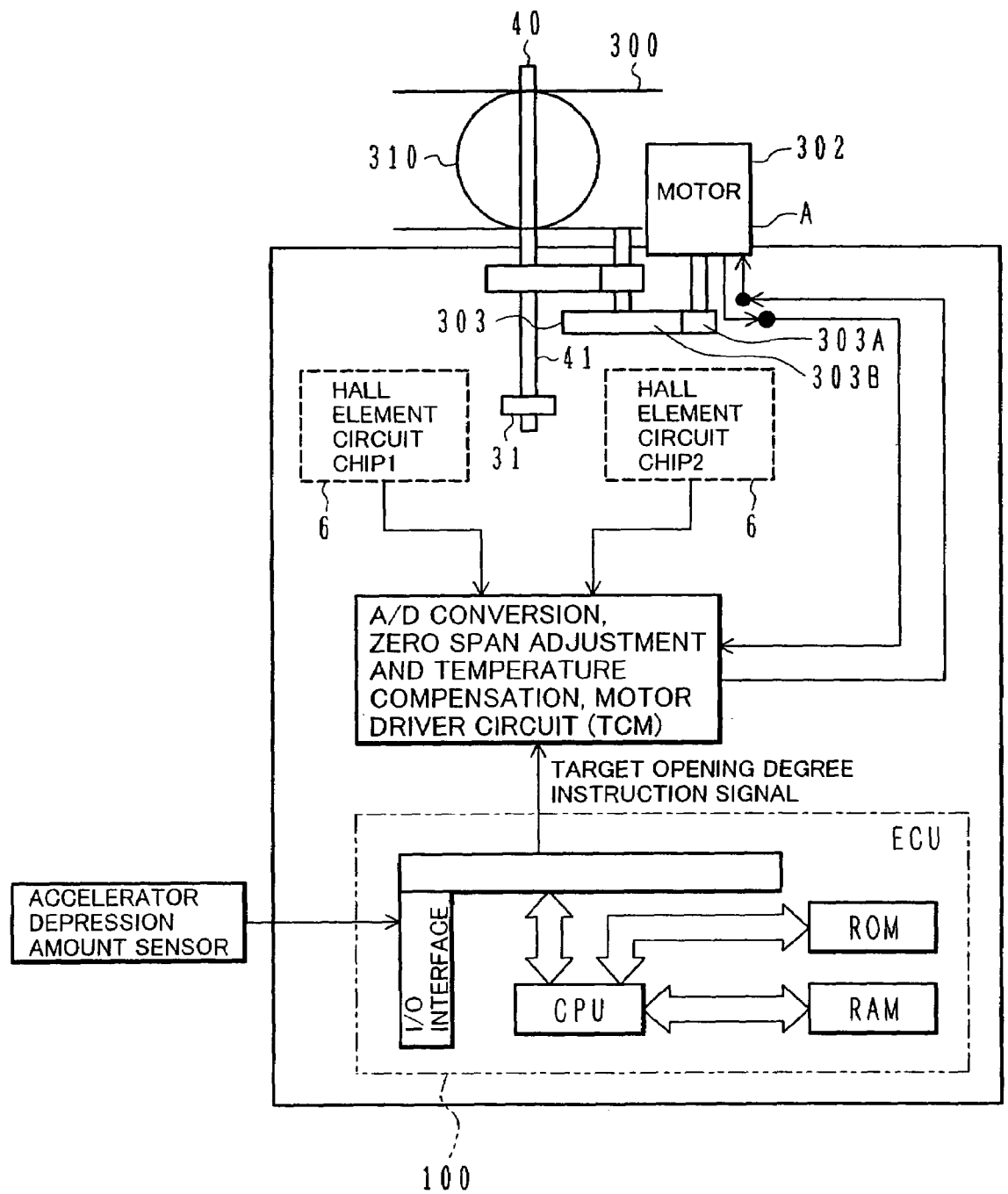
FIG. 4 is a circuit block diagram showing the configuration of an electron control type throttle valve apparatus according to the third embodiment of the present invention.

FIG. 4 is a schematic diagram showing the throttle valve apparatus according to the third embodiment of the invention. The third embodiment differs from the first embodiment in a point that the TCM and the ECU (the engine control unit) as well as the circuit mold chips (sensor chips) 6 for the throttle position sensor are incorporated within the gear cover 100. The circuit configuration of each of the circuit mold chip 6 and the TCM is same as FIG. 1.

The ECU receives a signal from an accelerator depression amount sensor thereby to calculate a target opening degree instruction signal. The ECU includes an input/output interface, a ROM having control program, a RAM for reading out the control program and storing sensor signals of various kinds of engine states, and a CPU for performing calculation processing.

Figure 5:
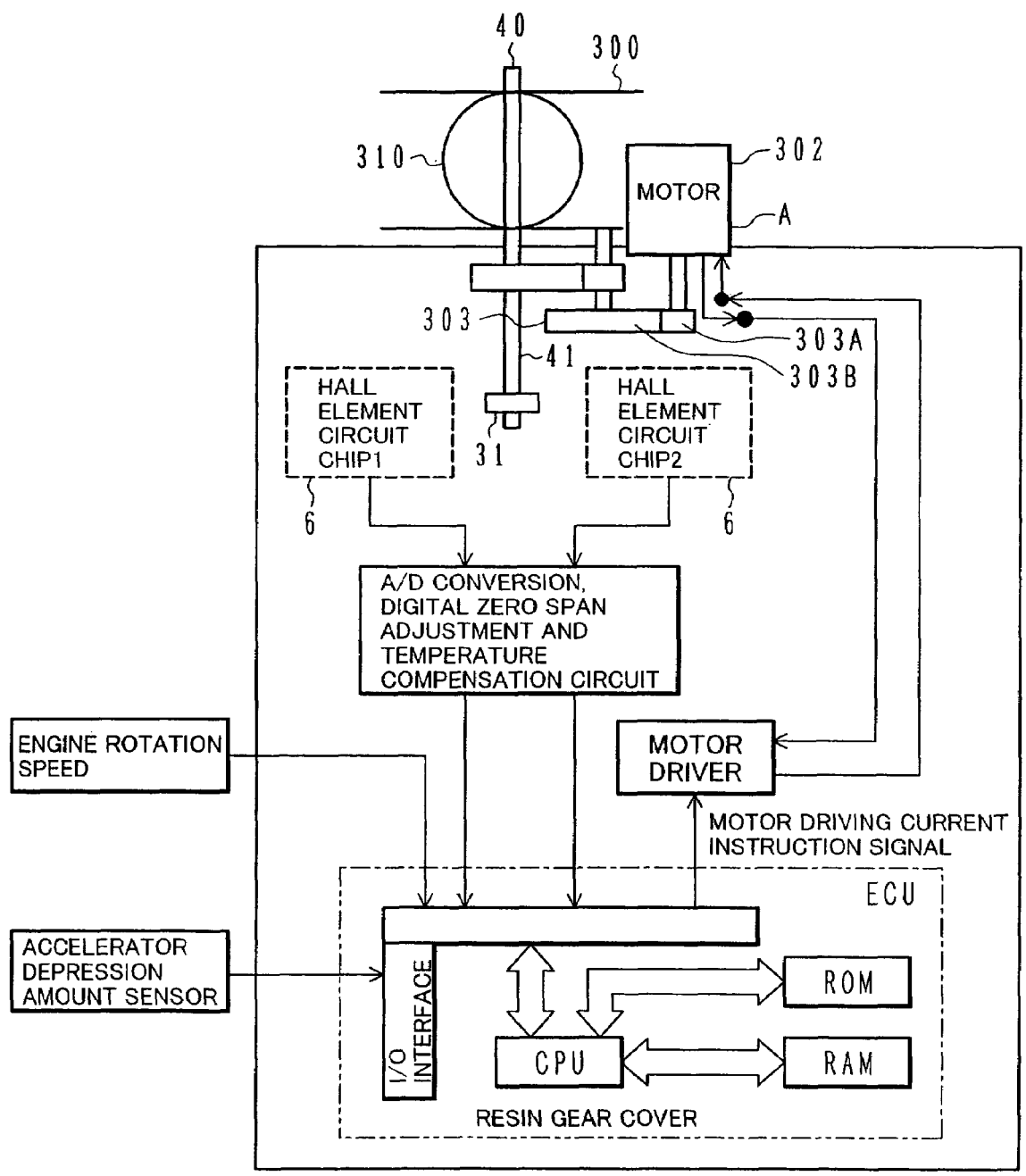
FIG. 5 is a circuit block diagram showing the configuration of an electron control type throttle valve apparatus according to the fourth embodiment of the present invention.

FIG. 5 is a schematic diagram showing the throttle valve apparatus according to the fourth embodiment of the invention. The fourth embodiment differs from the first embodiment in a point that the circuit mold chips (sensor chips) 6 for the throttle position sensor and the ECU are incorporated into the gear cover 100 and the control function of the TCM is contained in the CPU of the ECU. The A/D converter, the digital zero span adjustment circuit and the temperature compensation circuit serving as the pre-stage circuits of the ECU are incorporated into the gear cover 100. Further, a motor driver circuit is incorporated into the gear cover 100. The CPU of the ECU calculates the motor drive current and performs the feedback control.

According to the present invention, in the rotation angle detecting element, the hall element signal processing apparatus, the throttle valve control apparatus, wasteful or duplicated conversion processing of the hall element can be eliminated, so that the output of the hall element can be applied to the processing circuit at the succeeding stage as early as possible thereby not to cause control delay etc. of the device, for example.

What is claimed is:

1. A rotation angle detecting sensor used in a motor drive type throttle valve and including two hall elements, said sensor comprising:
    a resin body containing said hall element and covering a mechanical portion of said motor drive type throttle valve;
    plural electric conductors molded in said resin body and including at least a plurality of the following electric conductors,
    a connector configured as an external connection, and having plural external connection terminals formed integrally with the resin body;
    plural output signal conductors for conducting an output signal of an associated one of said hall elements to a specific output terminal, the output signal conductors being wired from the respective hall elements to the respective external connection terminals;
    a power supplying conductor for supplying a driving power to said hall element;
    an earth conductor for grounding said hall element; and
    first and second capacitors fixed at said resin body, wherein said first capacitor is electrically connected between said power supplying conductor and said earth conductor, and said second capacitor is electrically connected between said output signal conductor and said earth conductor, and includes plural conductors connected electrically between the respective out put signal conductors of the hall elements and the earth conductor.

2. The rotation angle detecting sensor according to claim 1, further including
    a microcomputer for inputting an output of the hall element having been converted from an analog signal into a digital signal and outputting an electric signal relating to the output of the hall element; and a signal transmission path from an output terminal of the hall element to an input interface of the microcomputer, wherein the signal transmission path has only one analog-to-digital conversion circuit.

3. The rotation angle detecting sensor according to claim 1, wherein the output of the analog-to-digital conversion circuit is transferred to the microcomputer through a communication line.

4. The rotation angle detecting sensor according to claim 1 further including
two amplifiers for amplifying outputs of the two hall devices, the two amplifiers being attached to the resin body;
a connector, formed at the resin body, for extracting outputs of the two amplifiers;
a circuit apparatus, coupled to the connector, for receiving the output signal of each of the hall devices, wherein an analog-to-digital conversion circuit for converting the output signal of each said hall device is provided at the circuit apparatus.

5. The rotation angle detecting sensor according to claim 1, wherein, at connection portions between the capacitors and to the electric conductors, the plural output signal conductors are wired at both sides of the power supplying conductor, a portion of the earth conductor is wired between one of the output signal conductors and the power supplying conductor, and another portion of the earth conductor is wired between the other output signal conductor and the power supplying conductor.

6. The rotation angle detecting sensor according to claim 1, wherein at least a part of the connection between the and the electric conductors on the mechanical portion of the resin body are covered by a cover containing the hall elements.

7. The rotation angle detecting sensor according to claim 1, wherein the output signal conductors of the sensor, the power supplying conductor of the sensor, the earth conductor, and a conductor supplying power to the motor are wired to the external connection terminals.

* * * * *